United States Patent Office
3,254,034
Patented May 31, 1966

3,254,034
ALUMINOSILICATE PROCESSING
Francis G. Dwyer, Cherry Hill, N.J., Albert B. Schwartz, Philadelphia, Pa., and Robert C. Wilson, Jr., Woodbury, N.J., assignors to Socony Mobil Oil Company, Inc., a corporation of New York
No Drawing. Filed Aug. 1, 1962, Ser. No. 213,895
25 Claims. (Cl. 252—430)

The present invention is related to processing of aqueous slurries of crystalline aluminosilicates. In one aspect, the invention is directed to aqueous slurries of crystalline aluminosilicates and methods of treatment to reduce its aqueous viscosity and to inhibit particle agglomeration in aqueous slurries. In another aspect, the invention relates to an improved method of reducing particle sizes of crystalline aluminosilicates in a more uniform size distribution.

Crystalline aluminosilicates can be widely used in many industrial applications such as adsorbents, a medium for separation of various hydrocarbons, catalysts or ingredients for catalysts used in hydrocarbon conversions and the like. In the various uses of these crystalline aluminosilicates, various forms are generally required and further processing is necessary. For instance, if it is desired to utilize a calcium aluminosilicate, ammonium aluminosilicate, hydrogen aluminosilicate, rare earth aluminosilicate, or the like, the method for preparation can include a base exchange of an aqueous slurry of sodium aluminosilicate with an aqueous solution containing the desired ions to replace the sodium ion. Since an aqueous base exchange solution is generally utilized, the aqueous slurry of the crystalline aluminosilicate should possess a low viscosity and must be maintained in a uniform dispersed phase avoiding agglomeration of the aluminosilicate particles so as to provide a thorough contact of the base exchange solution with the aluminosilicate to provide for an efficient ion exchange process. The reduction of the viscosity of aqueous aluminosilicate slurry may be accomplished by the addition of large quantities of water to the slurry, but this procedure may not prevent agglomeration of some of the aluminosilicate particles. If large quantities of water must be added to the aluminosilicate slurry, large process equipment is required to accomplish the desired base exchange. It is desirable, therefore, to utilize a more concentrated slurry of aluminosilicate to obtain the desired efficient base exchange operation while using smaller process equipment, and also avoid agglomeration of the aluminosilicate particles. Furthermore, in order to process the more concentrated slurries, the aqueous viscosity of these slurries must be low enough so that these slurries will flow and be readily capable of convenient handling or transfer by ordinary pumping procedures.

It is an object of this invention to provide an aqueous slurry of crystalline aluminosilicate having a materially reduced aqueous viscosity by a simple and inexpensive process.

Another object is directed to a method of avoiding agglomeration or causing deagglomeration of the crystalline aluminosilicate slurry and provide a slurry which can be efficiently base exchanged, if desired, and/or readily transferable using ordinary pumping procedures.

A further object of the invention is to provide an improved method of reducing particle sizes of crystalline aluminosilicate in a more uniform size distribution.

Accordingly, the present invention, in one embodiment, is directed to a method of reducing the viscosity of an aqueous slurry of crystalline aluminosilicate by combining with said aqueous slurry, various dispersants, in sufficient amounts, which will inhibit agglomeration of particles of said aluminosilicates. This method provides the distinct advantages of utilizing concentrated aqueous slurries of aluminosilicates in a highly efficient base-exchange operation and/or significantly improves the handling of the aluminosilicate slurries for further processing. In another embodiment, the present invention relates to a process for reducing the particle size of an aqueous slurry of crystalline aluminosilicates to provide a more uniform size distribution by grinding or ball milling said aluminosilicate slurry in the presence of sufficient amounts of various dispersants.

The crystalline aluminosilicate which makes up the aqueous slurry to be treated according to the process of the invention can include any synthetic or naturally occurring aluminosilicates. These aluminosilicates contain varying quantities of exchangeable cations such as alkaline earth metals, alkali metals, ammonium, hydrogen and the like. These cations, silicon, aluminum and oxygen in these zeolites are arranged in the form of an aluminosilicate salt in a definite and consistent crystalline pattern. The structure contains a large number of small cavities, interconnected by a number of still smaller holes or channels. These cavities and channels are precisely uniform in size. In general, the aluminosilicates used herein have uniform pore openings in the range from about 3 to about 15 Angstrom units. Typical aluminosilicates can include, among others, the synthetic zeolites as described in the following references: Zeolite A (U.S. 2,882,243), Zeolite B (U.S. 3,008,803), Zeolite E (U.S. 2,962,355), Zeolite F (U.S. 2,996,358), Zeolite H (U.S. 3,010,789), Zeolite J (U.S. 3,011,869), Zeolite L (German Patent 1,100,009), Zeolite M (U.S. 2,995,423), Zeolite Q (U.S. 2,991,151), Zeolite T (U.S. 2,950,952), Zeolite W (U.S. 3,012,853), Zeolite X (U.S. 2,882,244), Zeolite Y (Belgian Patents 577,642 and 598,582), Zeolite Z (U.S. 2,972,516), and modifications of the above described synthetic zeolites, such as, rare earth exchanged Zeolite X, and the like; and natural zeolites, such as, chabazite, analcite, gmelinite, levynite, erionite, sodalite, cancrinite, nepheline, lazurite, scolecite, natrolite, mesolite, heulandite, mordenite, brewsterite, ferrierite, and the like.

It is desirable that the aqueous aluminosilicate slurry have a solids content of said slurry, in the range from about 5 weight percent to about 50 weight percent, preferably in excess of 15 weight percent and more preferably higher in the range from about 20 to about 50 weight percent. It is to be understood, however, that the viscosity of an aqueous aluminosilicate slurry having a solids content below 15 weight percent can be reduced by the process of the invention but at this low solids concentration, the primary purpose of the dispersant is to avoid agglomeration of the aluminosilicate particles.

The dispersants which are combined with the aluminosilicate slurry in this process are those which will not only satisfactorily reduce the viscosity but also inhibit agglomeration of the aluminosilicate slurry. Suitable dispersants must be stable, must not chemically react with the aluminosilicates, and must not interfere with the ultimate use of the finished product. Various preferred classes of dispersants can be utilized. These dispersants include tannic acid, lecithin, ethylene oxide-alkyl phenol polymers, salts of lignin sulfonic acid, such as, the ammonium salt or those containing from about 4 to 11 weight percent sodium oxide, 0.3 to about 5 weight percent calcium oxide and 0.3 to 1.5 weight percent magnesium oxide, soluble salts of polymerized substituted benzoid alkyl sulfonic acids, alkali metals of a saturated fatty acid having from 12 to 20 carbon atoms, such as sodium stearate, and soluble salts of carboxymethyl cellulose. The effectiveness of the above-described dispersants can be readily demonstrated in 35 weight percent aqueous slurry of sodium aluminosilicate having uniform pore openings in the range from about 6 to about 15 Angstrom units. This slurry without the dispersants hase a viscosity of 3,600 centipoises at 20 second$^{-1}$ shear rate at 100° F. The addition of 2 weight percent, based on the dry solids of the above-described dispersants, to the slurry decreased the viscosity of said slurry from 3,600 to below 100. Under the same conditions, sodium carboxymethyl cellulose reduced the viscosity of the slurry to 470 centipoises at 20 seconds$^{-1}$ shear rate while sodium hexametaphosphate reduced the visosity to 940. Sodium alginate, gum arabic and carbopol, all known dispersants, failed to reduce the viscosity of the aqueous aluminosilicate slurry below 2400 and failed to prevent agglomeration. For purposes of satisfactory base-exchange and for purposes of obtaining uniform sizes of the aluminosilicate in a ball milling operation, it is desirable to obtain a viscosity below about 1000 centipoises at 20 second$^{-1}$ shear rate at 100° F. and preferably below 500 and more preferably below 100 centipoises at 20 second$^{-1}$ shear rate at 100° F. The dispersants which are combined with the aqueous aluminosilicate slurry in this process are selected to provide the best results under specific reaction conditions. For purposes of this invention, it has been found that optimum results can be obtained if the aqueous aluminosilicate slurries were maintained at temperatures in the range from about 50° F. to about 200° F. and at a pH above which the aluminosilicate structure will not be damaged. In most instances, a pH above 4 is desired, and it is generally preferred to utilize a pH from about 5 to about 13 and especially good results can be obtained at a pH from about 8 to about 12. At a pH below 4, there is a danger that crystalline aluminosilicates may be destroyed and lose their effectiveness for further use.

The amount of dispersants which are combined with the aqueous crystalline aluminosilicate slurry in the process of the invention can vary depending on the type and characteristics of aluminosilicate in the slurry, the concentration of the slurry, the type of dispersant, temperature of the slurry, pH of the slurry and the like. Generally, the quantity of dispersant can range from about 0.01 weight percent or lower to about 5 weight percent or higher, based on the dry solids of the slurry. Preferably, the amount of dispersant will range from about 0.03 weight percent to 4 weight percent, based on the dry solids of the slurry. In any event, the dispersant is combined in such amounts so as to deagglomerate or to prevent agglomeration of the particles and to obtain an aqueous viscosity of the slurry below about 1000 centipoises at 20 second$^{-1}$ shear rate.

The manner in which the dispersants are combined with the aqueous aluminosilicate slurry is not necessarily critical. The dispersants may be added to the water before adding the aluminosilicate, with the aluminosilicate on addition to the water, or to the aqueous slurry aluminosilicate. In any manner of combination, the dispersants will inhibit agglomeration and will deagglomerate the aluminosilicate particles when added to the aqueous aluminosilicate slurry.

The purpose of combining the dispersant with crystalline aluminosilicate slurries is to reduce the viscosity of the slurry and at the same time inhibit agglomeration of said aluminosilicate particles. In this manner, the handling of these slurries is greatly facilitated and regular pumping procedures can be utilized to transfer these slurries. However, another important feature of low viscosity slurries is the facilitation and improvement of base-exchange processes to replace the various ions in the aluminosilicates.

A further embodiment of the preesnt invention relates to the improvement of reducing the particle size of the crystalline aluminosilicate in a slurry by ball milling or grinding said particles in the presence of a sufficient amount of a suitable dispersant, heretofore described. Utilizing dispersants in an aqueous crystalline aluminosilicate slurry, it has been found that in a ball milling operation, the grinding efficiency has been improved to provide substantially increased amounts of smaller particle sizes and a more uniform size distribution has been obtained while avoiding agglomeration of the resulting product.

The following examples serve to illustrate the advantages of the present invention without limiting the same:

*Example 1*

An ion exchange operation was carried out to produce crystalline rare earth aluminosilicates from a powdered crystalline sodium aluminosilicate having uniform pore openings between 6 and 15 Angstrom units. The sodium aluminosilicate was prepared according to the procedure of U.S. 2,882,244.

Three tanks were connected in series and the charge to each of the three contacting vessels was as follows:

| | Pounds |
|---|---|
| Rare earth chloride ($RECl_3 \cdot 6H_2O$)* | 6.5 |
| Water | 70.2 |
| Sodium aluminosilicate (46.7 weight percent water) | 46.2 |

*Typical analysis of rare earth chloride:

| | Percent wt. |
|---|---|
| $CeCl_3 \cdot 6H_2O$ | 43.5 |
| $LaCl_3 \cdot 6H_2O$ | 23.0 |
| $NdCl_3 \cdot 6H_2O$ | 17.9 |
| $PrCl_3 \cdot 6H_2O$ | 5.4 |
| $SmCl_3 \cdot 6H_2O$ | 1.9 |
| $GdCl_3 \cdot 6H_2O$ | 0.6 |
| $YCl_3 \cdot 6H_2O$ and others | 0.2 |
| Impurities | 7.5 |

The charge was heated to 180° F. with agitation and held at 180° F. for 1 hour. At the end of 1 hour the addition of $RECl_3 \cdot 6H_2O$ solution to the first contacting stage was started at 1555 cc./min. with the overflow from the first tank going to the second, and the overflow from the third contacting stage going to a rotary filter and the cake discharge from the filter being returned to the first contacting stage. The temperature was maintained at 180° F. during the continuous addition, and addition was continued for 6 hours. The flow rate of the $$RECl_3 \cdot 6H_2O$$

solution was set to circulate the contents of the three contacting stages once per hour. The concentration of the $RECl_3 \cdot 6H_2O$ solution was 0.192 lb. $RECl_3 \cdot 6H_2O$/gal.

These conditions were selected to give 0.264 pound of $RECl_3 \cdot 6H_2O$ per pound of dry sodium aluminosilicate in the first hour of exchange and 0.066 pound of $$RECl_3 \cdot 6H_2O$$

per pound of dry sodium aluminosilicate in each of the six subsequent hours of exchange. Over the complete exchange cycle 0.66 pound of $RECl_3 \cdot 6H_2O$/pound of dry sodium aluminosilicate was used.

After completion of the exchange cycle, the heat was removed and water added at 1555 cc./min. for 4 hours to wash out residual salts. The exchanged product from the run contained 2.4% wt. sodium and 23.2% wt. rare earth oxides ($RE_2O_3$).

*Example 2*

To demonstrate the effect of a dispersant in improving the ion exchange process, an operation similar to Example 1 was conducted using sodium aluminosilicate as described in Example 1 using the following charge:

| | |
|---|---|
| $RECl_3 \cdot 6H_2O$, pounds | 7.7 |
| Water, pounds | 66.1 |
| Sodium aluminosilicate (47.3 weight percent water), pounds | 54.4 |
| A salt of lignin sulfonic acid containing 3.8 weight percent CaO, 4.9, weight percent $Na_2O$, 1 weight percent MgO, grams | [1] 26.5 |

[1] 0.2% weight based on dry sodium aluminosilicate.

The charge was heated to 180° F. and held at 180° F. for 45 minutes. At the end of 45 minutes, the addition of $RECl_3 \cdot 6H_2O$ solution to the first contacting stage was started at 2052 cc./min. with the overflow from the first tank going to the second, and the overflow from the third contacting stage going to a rotary filter and the cake discharge from the filter being returned to the first contacting stage. The temperature was maintained at 180° F. during the continuous addition, the addition was continued for 4½ hours. The flow rate of the $RECl_3 \cdot 6H_2O$ solution was set to circulate the contents of the three contacting stages once every 45 minutes. The concentration of the $RECl_3 \cdot 6H_2O$ solution was 0.237 lb.

$$RECl_3 \cdot 6H_2O/gal.$$

These conditions were selected to give 0.264 pound of $RECl_3 \cdot 6H_2O$ per pound of dry sodium aluminosilicate in the first 45-minute period of exchange and 0.066 pound of $RECl_3 \cdot 6H_2O$ per pound of dry sodium aluminosilicate in each of the six 45-minute subsequent periods of exchange. Over the complete exchange cycle 0.66 pound of $RECl_3 \cdot 6H_2O$/pound of dry sodium aluminosilicate was used.

After completion of the exchange cycle, the heat was removed and water added to wash out residual salts. The exchanged product from this run contained 1.9% wt. sodium and 24.4% wt. rare earth oxides ($RE_2O_3$).

It should be noted in comparing Examples 1 and 2 that the use of a dispersant in this base exchange operation greatly increased the efficiency of this operation by decreasing the amount of time necessary for base exchanging and increasing the amount of rare earth ions in the aluminosilicate and decreasing the sodium ions present therein. Thus, the reduction of the aqueous viscosity of the aqueous sodium aluminosilicate slurry and avoidance of agglomeration of the aluminosilicate particles can significantly improve this base-exchange operation. To demonstrate this improvement, a portion of the rare earth aluminosilicates prepared by the procedures of Examples 1 and 2 were used as cracking catalysts for n-hexane at 10 liquid hourly space velocity, catalyst to oil ratio of 4, and 700° F. The reaction rates were compared with the results of a commercial amorphous fresh silica-alumina catalyst, containing 10 weight percent aluminum oxide, evaluated at 1 liquid hourly space velocity, catalyst to oil ratio of 4 and 1000° F. The following relative reaction rates were obtained:

| | Amorphous silica-alumina | Rare earth aluminosilicate of Example 2, using a dispersant | Rare earth aluminosilicate of Example 1, no dispersant |
|---|---|---|---|
| Relative reaction rates for cracking n-Hexane | 1 | 300 | 130 |

*Example 3*

The effect of the addition of a water soluble dispersant composed of a salt of lignin sulfonic acid containing 3.8 weight percent CaO, 4.9 weight percent $Na_2O$ and 1 weight percent MgO to various crystalline aluminosilicate aqueous slurries was determined utilizing various concentrations of dispersant. The following results were obtained:

| Aqueous slurry description | Viscosity, centipoises at 20 second$^{-1}$ shear rate, 100° F. | | | | | |
|---|---|---|---|---|---|---|
| | [1] 0 | [1] 0.2 | [1] 0.3 | [1] 0.5 | [1] 1.0 | [1] 2.0 |
| Sodium aluminosilicate as described in Example 1 35 weight percent. | Thick paste | 480 | 15.5 | 8.0 | 8.0 | |
| Rare earth aluminosilicate as described in Example 1 36 weight per cent. | Thick paste | 780 | | 750 | | 220 |
| 25 weight per cent | | 470 | | 410 | | 15.5 |

[1] Dispersant, percent weight based on dry solids.

In a similar manner, a water-soluble dispersant composed of a salt of lignin sulfonic acid containing 11 weight percent $Na_2O$, 0.4 weight percent CaO and 0.5 weight percent MgO was added to a 20 weight percent rare earth aluminosilicate (described in Example 1) aqueous slurry utilizing various concentrations of dispersant. The following results are obtained:

| Viscosity, centipoises at 20 second$^{-1}$ shear rate, 100° F. | | |
|---|---|---|
| [1] 0.4 | [1] 0.6 | [1] 1.0 |
| 23.9 | 16.2 | 8.1 |

[1] Dispersant, percent weight based on dry solids.

*Example 4*

The effect of the addition of various water-soluble dispersants to a 35 weight percent sodium aluminosilicate (described in Example 1) aqueous slurry at 100° F. was determined utilizing 2 weight percent dispersant based on a dry solids basis. The following results were obtained:

| Dispersant: | Aqueous viscosity, centipoises at 20 second$^{-1}$ shear rate |
|---|---|
| None | 3,600 |
| Tannic acid | 10 |
| Sodium salts of polymerized substituted benzoid alkyl sulfonic acids (Daxad 23 Dewey and Almy Chemical Co.) | 9 |
| Ammonium salt of lignin sulfonic acid | 11 |
| Lecithin | 12 |
| Ethylene oxide alkyl phenol polymer | 52 |
| Sodium stearate | 67 |
| Sodium hexametaphosphate | 940 |
| Sodium carboxymethyl cellulose | 470 |
| Sodium alginate | 6,000 |
| Gum arabic | 2,400 |
| Carboxy vinyl polymer (high molecular weight) (Carbopol—B. F. Goodrich) | >10,000 |

*Example 5*

A batch-type, pilot unit ball mill was used to grind a slurry of 36 weight percent rare earth aluminosilicate prepared according to the procedure of Example 1 without a dispersant added and the same slurry with 0.065 weight percent based on the solids of an added water-soluble dispersant composed of a salt of lignin sulfonic acid containing 3.8 weight percent CaO, 4.9 weight percent $Na_2O$ and 1 weight percent MgO. The viscosity of the slurry containing the dispersant was about 800 centipoises at 20 second$^{-1}$ shear rate at 100° F., while that for the slurry without dispersant was >3000 centipoises. The ball mill, which rotated at 42 revolutions per minute, was approximately 16 inches inside diameter and 16 inches long (1.86 cubic feet volume). The apparent volume of the grinding medium (½ inch to ⅝ inch flint pebbles) was 40 percent of the mill volume and the volume occupied by the grinding medium plus the slurry was 50 percent of the mill volume. After grinding in this manner for 2 hours, the particle size characteristics were determined. Test data on the charge and the product are as follows:

| Particle size data | No dispersant added | | Dispersant added | |
|---|---|---|---|---|
| | Charge | Product | Charge | Product |
| Weight mean particle diameter, microns | 7.0 | 4.1 | 7.0 | 3.4 |
| Surface mean particle diameter, microns | 2.9 | 2.3 | 2.9 | 2.4 |
| Percent >10 microns | 11 | 6 | 11 | 2 |
| Percent <2 microns | 16 | 21 | 16 | 28 |

The above data indicate that lower viscosity and more finely divided particles are obtained in ball milling the slurry containing the dispersant than the slurry containing no dispersant. It should be further noted that with the slurry product containing the dispersant the particles over 10 microns in size have been reduced by a factor of 3 compared with the product slurry containing no dispersant. Since it is desirable to utilize particle size material below 10 microns in fluid catalysts and, in particular, bead catalyst preparation, the use of the dispersant in the slurry to be ball milled provided substantial improvements in the particle size distribution by substantially reducing the amount of fines greater than 10 microns.

*Example 6*

An aqueous slurry containing 25 weight percent of rare earth aluminosilicate (as described in Example 1) and containing 0.4 weight percent, based on the solids, of a dispersant composed of a salt of lignin sulfonic acid containing 11 weight percent $Na_2O$, 0.4 weight percent CaO, and 0.5 weight percent MgO was ball milled according to the procedure described in Example 5 for 1¼ hours. Test data on the charge and the product are as follows:

| Particle Size Data | Charge | Product |
|---|---|---|
| Weight mean particle diameter, microns | 4.8 | 4.1 |
| Surface mean particle diameter, microns | 3.3 | 2.7 |
| Percent >10 microns | 4 | 2 |
| Percent <2 microns | 8 | 14 |
| Percent <2 microns | 8 | 14 |

It is to be understood that the foregoing description is merely illustrative of preferred embodiments of the invention of which many variations may be made by those skilled in the art within the scope of the following claims without departing from the spirit thereof.

What is claimed is:

1. A method for producing an aqueous slurry of a crystalline aluminosilicate which comprises combining an aqueous slurry of a crystalline aluminosilicate characterized by uniform pore openings from about 3 to about 15 Angstrom units and a dispersant in an amount to prevent agglomeration of the particles of aluminosilicate and to obtain an aqueous viscosity of said slurry below about 100 centipoises at 20 second$^{-1}$ shear rate at 100° F., said dispersant being selected from the group consisting of tannic acid, lecithin, ethylene oxide-alkyl phenol polymers, salts of lignin sulfonic acid, water soluble salts of polymerized substituted benzoid alkyl sulfonic acids and alkali metal salts of saturated fatty acids having from 12 to 20 carbon atoms.

2. The method of claim 1 wherein the dispersant is a salt of lignin sulfonic acid.

3. The method of claim 1 wherein the dispersant is an ammonium salt of lignin sulfonic acid.

4. The method of claim 1 wherein the dispersant is a salt of lignin sulfonic acid containing from about 4 to 11 weight percent sodium oxide, 0.3 to about 5 weight percent calcium oxide and 0.3 to 1.5 weight percent magnesium oxide.

5. A method of producing an aqueous slurry containing from about 5 to about 50 weight percent of a crystalline aluminosilicate characterized by uniform pore openings from about 3 to about 15 Angstrom units which comprises combining said aluminosilicate slurry and a dispersant, in an amount of at least about 0.01 weight percent based on the dry solids content of said slurry to obtain an aqueous viscosity of said slurry below about 100 centipoises at 20 second$^{-1}$ shear rate at 100° F., said dispersant being selected from the group consisting of tannic acid, lecithin, ethylene oxide-alkyl phenol polymers, salts of lignin sulfonic acid, water soluble salts of polymerized substituted benzoid alkyl sulfonic acids and alkali metal salts of saturated fatty acids having from 12 to 20 carbon atoms.

6. A method of producing an aqueous slurry containing from about 20 to about 50 weight percent of a crystalline aluminosilicate characterized by uniform pore openings from about 3 to about 15 Angstrom units which comprises combining said aluminosilicate slurry and a dispersant, in an amount of at least about 0.03 weight percent based on the dry solids content of said slurry to obtain an aqueous viscosity of said slurry below about 100 centipoises at 20 second$^{-1}$ shear rate at 100° F., said dispersant being selected from the group consisting of tannic acid, lecithin, ethylene oxide-alkyl phenol polymers, salts of lignin sulfonic acid, water soluble salts of polymerized substituted benzoid alkyl sulfonic acids and alkali metal salts of saturated fatty acids having from 12 to 20 carbon atoms.

7. The method of claim 5 wherein the crystalline aluminosilicate is sodium aluminosilicate.

8. The method of claim 5 wherein the crystalline aluminosilicate is a rare earth metal aluminosilicate.

9. A method of producing an aqueous slurry of a crystalline sodium aluminosilicate which comprises combining an aqueous slurry of a crystalline sodium aluminosilicate characterized by uniform pore openings from about 3 to about 15 Angstrom units and a dispersant of a salt of lignin sulfonic acid present in an amount to prevent agglomeration of particles of said crystalline sodium aluminosilicate and to obtain an aqueous viscosity of said slurry below about 100 centipoises at 20 second$^{-1}$ shear rate at 100° F.

10. A method of producing an aqueous slurry of a crystalline rare earth metal aluminosilicate which comprises combining an aqueous slurry of a crystalline rare earth metal aluminosilicate characterized by uniform pore openings from about 3 to about 15 Angstrom units and a dispersant of a salt of lignin sulfonic acid present in an amount to prevent agglomeration of particles of said crystalline rare earth aluminosilicate and to obtain an aqueous viscosity of said slurry below about 100 centipoises at 20 second$^{-1}$ shear rate at 100° F.

11. The combination of an aqueous slurry of a crystalline aluminosilicate characterized by uniform pore openings from about 3 to about 15 Angstrom units and a dispersant, capable of inhibiting agglomeration of the particles of said aluminosilicate and to obtain an aqueous viscosity of said slurry below about 100 centipoises at 20 second$^{-1}$ shear rate at 100° F., said dispersant being selected from the group consisting of tannic, acid, lecithin, ethylene oxide-alkyl phenol polymers, salts of lignin sulfonic acid, water soluble salts of polymerized substituted benzoid alkyl sulfonic acids and alkali metal salts of saturated fatty acids having from 12 to 20 carbon atoms.

12. The combination of an aqueous slurry containing from about 5 to about 50 weight percent of a crystalline aluminosilicate characterized by uniform pore openings from about 3 to about 15 Angstrom units and a dispersant in an amount of at least about 0.01 weight percent based on the dry solids content of said slurry, capable of inhibiting agglomeration of the particles of said aluminosilicate and to obtain an aqueous viscosity of said slurry below about 100 centipoises at 20 second⁻¹ shear rate at 100° F., said dispersant being selected from the group consisting of tannic acid, lecithin, ethylene oxide-alkyl phenol polymers, salts of lignin sulfonic acid, water soluble salts of polymerized substituted benzoid alkyl sulfonic acids and alkali metal salts of saturated fatty acids having from 12 to 20 carbon atoms.

13. The combination of an aqueous slurry containing from about 20 to about 50 weight percent of a crystalline aluminosilicate characterized by uniform pore openings from about 3 to about 15 Angstrom units and a dispersant in an amount of at least about 0.03 weight percent based on the dry solids content of said slurry, capable of inhibiting agglomeration of the particles of said aluminosilicate and to obtain an aqueous viscosity of said slurry below about 100 centipoises at 20 second⁻¹ shear rate at 100° F., said dispersant being selected from the group consisting of tannic acid, lecithin, ethylene oxide-alkyl phenol polymers, salts of lignin sulfonic acid, water soluble salts of polymerized substituted benzoid alkyl sulfonic acids and alkali metal salts of saturated fatty acids having from 12 to 20 carbon atoms.

14. The combination of claim 11 wherein the dispersant is a salt of lignin sulfonic acid.

15. The combination of claim 11 wherein the dispersant is an ammonium salt of lignin sulfonic acid.

16. The combination of claim 11 wherein the dispersant is a salt of lignin sulfonic acid containing from about 4 to 11 weight percent sodium oxide, 0.3 to about 5 weight percent calcium oxide and 0.3 to 1.5 weight percent magnesium oxide.

17. The combination of claim 12 wherein the crystalline aluminosilicate is sodium aluminosilicate.

18. The combination of claim 12 wherein the crystalline aluminosilicate is a rare earth metal aluminosilicate.

19. The combination of an aqueous slurry of a crystalline sodium aluminosilicate characterized by uniform pore openings from about 3 to about 15 Angstrom units and a dispersant of a salt of lignin sulfonic acid in an amount sufficient to prevent agglomeration of the particles of aluminosilicate and to obtain an aqueous viscosity below about 100 centipoises at 20 second⁻¹ shear rate at 100° F.

20. The combination of an aqueous slurry of a crystalline rare earth metal aluminosilicate characterized by uniform pore openings from about 3 to about 15 Angstrom units and a dispersant of a salt of lignin sulfonic acid in an amount sufficient to prevent agglomeration of the particles of aluminosilicate and to obtain an aqueous viscosity below about 100 centipoises at 20 second⁻¹ shear rate at 100° F.

21. An improved process for reducing the particle size of a crystalline aluminosilicate characterized by uniform pore openings from about 3 to about 15 Angstrom units, which comprises grinding said crystalline aluminosilicate in an aqueous slurry containing a dispersant in an amount to prevent agglomeration of the particles of aluminosilicate and to obtain an aqueous viscosity of said slurry below about 100 centipoises at 20 second⁻¹ shear rate at 100° F., said dispersant being selected from the group consisting of tannic acid, lecithin, ethylene oxide-alkyl phenol polymers, salts of lignin sulfonic acid, water soluble salts of polymerized substituted benzoid alkyl sulfonic acids and alkali metal salts of saturated fatty acids having from 12 to 20 carbon atoms.

22. An improved process for reducing the particle size of a crystalline aluminosilicate characterized by uniform pore openings from about 3 to about 15 Angstrom units, which comprises grinding said crystalline aluminosilicate in an aqueous slurry containing from about 5 to about 50 weight percent of said aluminosilicate and a dispersant in an amount of at least about 0.01 weight percent based on the dry solids content of said slurry to obtain an aqueous viscosity of said slurry below about 100 centipoises at 20 second⁻¹ shear rate at 100° F., said dispersant being selected from the group consisting of tannic acid, lecithin, ethylene oxide-alkyl phenol polymers, salts of lignin sulfonic acid, water soluble salts of polymerized substituted benzoid alkyl sulfonic acids and alkali metal salts of saturated fatty acids having from 12 to 20 carbon atoms.

23. The process of claim 21 wherein the dispersant is a salt of lignin sulfonic acid.

24. The process of claim 21 wherein the dispersant is an ammonium salt of lignin sulfonic acid.

25. The process of claim 21 wherein the dispersant is a salt of lignin sulfonic acid containing from about 4 to 11 weight percent sodium oxide, 0.3 to about 5 weight percent calcium oxide and 0.3 to 1.5 weight percent magnesium oxide.

References Cited by the Examiner

UNITED STATES PATENTS

| | | | |
|---|---|---|---|
| 2,893,913 | 7/1959 | Wiedow | 252—351 |
| 2,920,974 | 1/1960 | Allen | 252—455 |
| 2,921,034 | 1/1960 | Houdry | 252—455 |
| 3,025,246 | 3/1962 | Reid | 252—455 |
| 3,069,361 | 12/1962 | Cogswell | 252—351 |
| 3,100,230 | 8/1963 | Mansfield | 252—351 |

FOREIGN PATENTS

| | | |
|---|---|---|
| 880,827 | 1/1943 | France. |
| 988,514 | 5/1951 | France. |

TOBIAS E. LEVOW, *Primary Examiner.*

SAMUEL H. BLECH, *Examiner.*

P. D. FREEDMAN, J. G. LEVITT, *Assistant Examiners.*